United States Patent
Madden

(10) Patent No.: US 10,817,943 B2
(45) Date of Patent: *Oct. 27, 2020

(54) VOLUME ATTENTIVE TRADE LIQUIDITY BUILDER

(71) Applicant: The Bartley J. Madden Foundation, Naples, FL (US)

(72) Inventor: Bartley J. Madden, Naples, FL (US)

(73) Assignee: The Bartley J. Madden Foundation, Naples, FL (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/375,560

(22) Filed: Apr. 4, 2019

(65) Prior Publication Data

US 2019/0236702 A1 Aug. 1, 2019

Related U.S. Application Data

(63) Continuation of application No. 15/382,876, filed on Dec. 19, 2016.

(51) Int. Cl.
*G06Q 40/04* (2012.01)
*G06Q 40/06* (2012.01)

(52) U.S. Cl.
CPC .............. *G06Q 40/04* (2013.01); *G06Q 40/06* (2013.01)

(58) Field of Classification Search
CPC .................................................... G06Q 40/04
USPC ............................................................ 705/35
See application file for complete search history.

(56) References Cited

U.S. PATENT DOCUMENTS

| | | |
|---|---|---|
| 6,615,188 B1 | 9/2003 | Breen et al. |
| 7,209,896 B1 | 4/2007 | Serkin et al. |
| 8,306,904 B1 | 11/2012 | Marchini et al. |
| 2002/0161687 A1 | 10/2002 | Serkin et al. |
| 2003/0208432 A1 | 11/2003 | Wallman |
| 2003/0225673 A1 | 12/2003 | Hughes et al. |
| 2003/0229569 A1 | 12/2003 | Nalbandian et al. |
| 2004/0024690 A1 | 2/2004 | Satow et al. |
| 2004/0210511 A1 | 10/2004 | Waelbroeck et al. |

(Continued)

OTHER PUBLICATIONS

"Dynamical Models of Market Impact and Algorithms for Order Execution," Handbook on Systemic Risk, Jean-Pierre Fouque, Joseph A. Langsam, eds., Cambridge, 2013 (Year: 2013).*

(Continued)

*Primary Examiner* — Sara C Hamilton
(74) *Attorney, Agent, or Firm* — Marshall, Gerstein & Borun LLP; Randall G. Rueth

(57) ABSTRACT

Systems and methods are described for aggregating and filling Volume Attentive Trade (VAT) orders using a VAT Liquidity Builder. As described, in various aspects a first grouping of VAT orders may be aggregated by the VAT Liquidity Builder. A second grouping of VAT orders may also be aggregated by the VAT Liquidity Builder. Each of the VAT orders for the first and second groups may each include a set of VAT rules that define a limit price, a share quantity and a VAT delta. The VAT Liquidity Builder may then generate an effective limit price for each of the first group of VAT orders using the corresponding limit prices and VAT deltas, and generate an execution command to fill a particular VAT order having the largest share quantity from the second group of VAT orders with one or more qualifying VAT orders from the first group.

30 Claims, 7 Drawing Sheets

(56) References Cited

U.S. PATENT DOCUMENTS

| | | |
|---|---|---|
| 2005/0102217 A1 | 5/2005 | Burns et al. |
| 2006/0026090 A1 | 2/2006 | Balabon |
| 2006/0253381 A1 | 11/2006 | Adcock et al. |
| 2007/0192230 A1 | 8/2007 | Meacham et al. |
| 2008/0133393 A1 | 6/2008 | Arnold et al. |
| 2008/0172318 A1 | 7/2008 | Bartko et al. |
| 2009/0276349 A1 | 11/2009 | Lutnick et al. |
| 2009/0319417 A1 | 12/2009 | Littlewood |
| 2010/0293110 A1 | 11/2010 | Rosenthal et al. |
| 2011/0119176 A1 | 5/2011 | Hanson et al. |
| 2011/0238555 A1 | 9/2011 | Rosenthal |
| 2011/0251942 A1 | 10/2011 | Rosenthal et al. |
| 2011/0258139 A1 | 10/2011 | Steiner |
| 2012/0116942 A1 | 5/2012 | Voigt |
| 2013/0204759 A1 | 8/2013 | Lutnick et al. |
| 2014/0006243 A1 | 1/2014 | Boudreault et al. |
| 2014/0081827 A1 | 3/2014 | Chiulli et al. |
| 2014/0129406 A1 | 5/2014 | White et al. |
| 2015/0095207 A1 | 4/2015 | Kodde |
| 2016/0019644 A1 | 1/2016 | Boudreault et al. |
| 2016/0086266 A1 | 3/2016 | Labuszewski et al. |
| 2016/0086267 A1 | 3/2016 | Labuszewski et al. |
| 2016/0086268 A1 | 3/2016 | Labuszewski et al. |
| 2016/0086269 A1 | 3/2016 | Baker |
| 2016/0092984 A1 | 3/2016 | Shontz et al. |
| 2016/0253754 A1 | 9/2016 | Ben-Porat et al. |
| 2017/0046783 A1 | 2/2017 | Hosman et al. |
| 2017/0103461 A1 | 4/2017 | Acuna-Rohter et al. |

OTHER PUBLICATIONS

Gatheral et al., Dynamical models of market impact and algorithms for order execution, Handbook on Systemic Risk, Cambridge University Press, (2013).

Delta Definition by Merriam-Webster, pp. 1-13. As printed: Sep. 13, 2017.

* cited by examiner

| Retail VAT Buy Orders | | | | |
|---|---|---|---|---|
| Investor | # shares | Limit Price | VAT Delta | Highest Price to Buy |
| A | 20,000 | 10.03 | .03 | 10.06 |
| B | 10,000 | 10.04 | .02 | 10.06 |
| C | 15,000 | 10.02 | .05 | 10.07 |

*FIG. 3A*

| Institutional VAT Sell Orders | | | | |
|---|---|---|---|---|
| Investor | # shares | Limit Price | | |
| D | 40,000 | 10.06 | | |
| E | 35,000 | 10.06 | | |

*FIG. 3B*

VOLUME ATTENTIVE TRADE LIQUIDITY BUILDER

CROSS REFERENCE TO RELATED APPLICATIONS

The present application is a continuation of U.S. patent application Ser. No. 15/382,876, entitled "VOLUME ATTENTIVE TRADE LIQUIDITY BUILDER," filed on Dec. 19, 2016, the disclosure of which is hereby incorporated herein by reference.

FIELD OF THE DISCLOSURE

The present disclosure generally relates to systems and methods for a volume attentive trade (VAT) Liquidity Builder for facilitating and incentivizing order aggregation and execution for market participants.

BACKGROUND

Continuous-time markets, such as those provided by stock exchange systems, are focused on providing the best price to investors and may process, for example, a very small number of shares of a given stock for a typical trade. In a typical scenario, investors wanting to buy shares of a specific stock are instantly (or near-instantly) matched with sellers who want to sell shares of the same stock, where a trade is executed if the bid price for an order of the buyer and the ask price for an order of the seller meet or overlap.

Discrete-time markets, such as call auctions, execute the maximum number of shares given the available limit orders to buy and sell. A limit order is an order to buy or sell a stock at a specific price or better. For example, a buy limit order can only be executed at the limit price or at a lower price. A sell limit order can only be executed at the limit price or at a higher price. In either case, a limit order is not guaranteed to execute. Instead, it depends on the prices of the available stocks, or other securities, available for trade in the market.

Limit orders may be traded, for example, by retail investors which may include individual investors or retail brokers who trade on behalf of individual investors. Retail investors who make public limit orders on, for example, a public stock exchange, often experience issues with high frequency traders, e.g., other investors that use automated trading systems or software platforms to identify the retail investor's public limit orders, e.g., by using a public book listing publicly traded orders, to fill their own high frequency orders by offering one tenth of a cent or so "better" price. Such practice allows the high frequency traders to jump in front of, or otherwise trade before, the limit orders of the retail investors.

The issues with high frequency are typically compounded when a retail investor needs to fill a large order of many shares because high frequency trading platforms typically seek to identify large quantity trades. To combat this, retail investors may employ a strategy of splitting a large size order into smaller, numerous, and separately traded orders to avoid the aforementioned consequences of being detected by the high frequency trading platforms. Consequently, their smaller, publically displayed limit orders would represent only a small portion of the full position needing to be bought or sold. Such a strategy can backfire, however, because splitting a large size order into numerous smaller orders can create new issues with the timing of the smaller trades, such as, for example, the retail investor's own trades affecting the share price for his or her subsequent trades or the retail investor losing a preferred trading price based on other market activity that occurs while the smaller separate trades are awaiting to be traded. For these retail investors, achieving the best price, for example, on a few hundred shares of the first of the smaller orders, does not satisfy their need to fill a large number of shares at a satisfactory price. And, even if the smaller order strategy is employed, there remains an opportunity for a savvy high frequency trader to detect the numerous publicly identifiable smaller orders trades, e.g., by detecting numerous small orders of the same stock, and not necessarily, a large quantity trade, and, therefore, still place orders in front of the retail investor.

Other investors, called institutional investors, may make limit orders on behalf of their respective members, e.g., fund participants. Institutional investors may include banks, insurance companies, pensions, hedge funds, real estate investment trusts (REITs), investment advisors, endowments, mutual funds, or institutional brokers who trade on behalf of such entities. Institutional investors typically make large size trades on major exchanges that can greatly influence the prices of stocks and other securities.

Institutional investors may trade with each other on alternative trading systems (ATS) that are not designed to interact with retail investors. The ATS allow institutional investors to make confidential trades of large sizes. Because the trades are confidential, at least some types of ATSs have come to be known as "dark pools."

In addition, the number of ATS platforms available for institutional investors to trade on has grown significantly over the past several years. For example, these ATS platforms are now available from a number of providers including, for example, Barclays ATS, Credit Suisse Securities (USA) LLC, Interactive Brokers LLC, J.P. Morgan ATS, and UBS ATS. This variety of options creates a liquidity issue, i.e., because there currently exists a large number of options of alternative trading systems, the overall liquidity, e.g., the degree to which an asset, stock, or security can be quickly bought or sold in the market, is reduced for all institutional investors because there is no centralized or otherwise commonly managed system to facilitate the various institutional investor orders. Moreover, the large size orders, which are typical of the orders placed by institutional investors, further compound the liquidity problem, because there may be no other single market participant, such as another institutional investor, willing to enter into the other side of a large trade on a particular ATS platform. Accordingly, in such situations, an institutional investor using a given ATS may experience an unfavorable trading price or may not be able to fill a given order in the first instance.

BRIEF SUMMARY

The embodiments disclosed herein describe systems and methods for a volume attentive trade (VAT) Liquidity Builder for facilitating and incentivizing order aggregation and execution for market participants. The VAT Liquidity Builder facilitates building liquidity across multiple groups of investor types where, in one aspect, the system may operate to aggregate and coordinate the needs of both retail and institutional orders. For example, currently, a need exists for a centralized location, or at least a common system, to fill large institutional orders, thereby increasing liquidity for institutional, or otherwise large, trades. For example, large trades involving institutional investors invariably have at least one side wanting to execute more shares, which is a current untapped source of liquidity.

Moreover, institutional investors currently have neither the means nor the incentive to participate with retail investors for executing large orders. The disclosed VAT Liquidity Builder system addresses this concern. For example, the VAT Liquidity Builder can facilitate retail investors seeking to fill large quantity orders and also allow such investors to keep confidential their full positions to facilitate avoiding public disclosure that would move the market away from them, e.g., due to detection by high frequency traders. Retail investors would also benefit from participation in large trades with institutional investors. For example, retail investors who need to fill large order quantities would consider direct participation with institutional investors as exceedingly valuable. This is because such retail investors would be able to execute orders having a large number of shares against the orders of institutional investors and, in some embodiments, without experiencing the aforementioned negative consequences of high frequency trading.

For the foregoing reasons, there is a need for systems and methods for aggregating and filling VAT orders. As described, in various aspects a first grouping of VAT orders may be aggregated by a VAT Liquidity Builder system. A second grouping of VAT orders may also be aggregated by the VAT Liquidity Builder system. Each of the VAT orders for the first and second groups may each include a set of VAT rules that define a limit price, a share quantity and a VAT delta. The VAT Liquidity Builder system may then generate an effective limit price for each of the first group of VAT orders using the corresponding limit prices and VAT deltas. The VAT Liquidity Builder system may also generate an execution command to fill a particular VAT order from the second group of VAT orders with one or more qualifying VAT orders from the first group.

In some aspects, the particular VAT order may have the greatest share quantity with respect to any other VAT order of the second group. In other aspects, the effective limit price associated with the qualifying VAT orders equals or overlaps the limit price of the particular VAT order from the second grouping.

In further embodiments, the VAT Liquidity Builder system is further configured to prioritize the qualifying VAT orders such that the VAT order with the greatest effective limit price is filled before any other of the one or more qualifying VAT orders. In other embodiments, the VAT Liquidity Builder system is further configured to prioritize the qualifying VAT orders such that the VAT order having the greatest share quantity is filled before any other qualifying VAT order.

In some embodiments, the first grouping may comprise VAT orders associated with retail investors or other non-institutional investors. In other embodiments, the second grouping may comprise VAT orders associated with institutional investors. In other aspects, the second grouping may comprise VAT orders of non-institutional investors where the VAT orders have a share quantity that exceeds a threshold quantity.

In some embodiments, the VAT Liquidity Builder system may determine the first grouping and the second grouping based upon a minimum share quantity, where a new or updated VAT order can be aggregated with the first group if the new or updated order is below the minimum share quantity, and where the new or updated VAT order can be aggregated with the second group if the new or updated order is equal to or greater than the minimum share quantity.

In other embodiments, the VAT rules may include a specified range of execution prices for a corresponding VAT order and an indication as to whether to suspend the execution command for the corresponding VAT order if the limit price associated with the corresponding VAT order is not within the specified range of execution prices. The VAT rules may also include an indication as to whether to automatically resume the execution command for the corresponding VAT order if the limit price associated with the corresponding VAT order is within the specified range of execution prices.

In some embodiments, VAT Liquidity Builder system maintains the confidentiality of the VAT orders, VAT rules, or other information associated with the system such that there is no public disclosure with respect to the VAT orders, VAT rules, or other information associated with the system.

In other embodiments, the VAT Liquidity Builder system may generate a record for a particular VAT order, which may include information or a reference to information, which can be, for example, an identifier in a database, to the particular VAT order, where the record can further include a timestamp indicating when the particular VAT order was executed, the one or more qualifying VAT orders associated with the particular VAT order, and a reference capable of linking the record to other generated records of the VAT Liquidity Builder system.

The VAT Liquidity Builder facilitates efficiency in the market, for example, by allowing large orders at a satisfactory price for participants. The VAT Liquidity Builder creates liquidity by incentivizing its participants. For example, in disclosed embodiments, significant preferences are given to institutional VAT orders. In other embodiments, the same preferences are given to large retail VAT orders that exceed a certain share quantity. For example, such large retail orders can become institutional orders and treated accordingly by the VAT Liquidity Builder. In contrast to prior art systems, embodiments of the dynamic system of the VAT Liquidity Builder promotes liquidity through order share quantity and order aggregation.

In another aspect, VAT Liquidity Builder provides a novel solution that leverages a unique incentive structure that is capable of providing better liquidity (e.g., a large number of retail investors with orders of substantial size) than alternative trading systems used by institutional investors. Moreover, compared to traditional stock exchanges, the VAT Liquidity Builder offers a unique advantage to retail investors to avoid inefficiencies with the public limit book, e.g., by competing with high frequency trading platforms, while filling large orders via institutional liquidity. The result is improved trade executions for both retail and institutional investors.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 3A illustrates a table depicting an exemplary grouping of retail VAT orders that may be aggregated in the VAT Liquidity Builder system of FIG. 1.

FIG. 3B illustrates a table depicting an exemplary grouping of institutional VAT orders that may be aggregated in the VAT Liquidity Builder system of FIG. 1.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, systems and methods for a Volume Attentive Trade (VAT) Liquidity Builder. As described in the disclosed embodiments, the VAT Liquidity Builder is a confidential, computerized system that continuously compares aggregated VAT limit orders of a first group, for example, retail VAT orders, to aggregated VAT orders of a second group, for example, institutional VAT orders. In certain aspects, the VAT Liquidity Builder builds up (aggregates) orders for execution in continuous time. In contrast to traditional static systems, e.g., a call auction system, that use a given set of limit orders at discrete points in time, the Liquidity Builder is a dynamic system that aggregates VAT orders in a continuous manner and that incentivizes both retail and institutional investors to increase their order sizes thereby improving centralized liquidity. Moreover, for some embodiments, in contrast to both the static operation of a call auction and the time preference for limit orders employed by stock exchanges, VAT orders of the VAT Liquidity Builder may be subject to an over-riding restriction—when multiple investors have orders at the same price, in some aspects, the largest order, regardless of when submitted, gets filled first. This is a distinct incentive provided by the VAT Liquidity Builder which allows investors to increase order size and, in some aspects, enhance liquidity at a centralized system. The advantages of the VAT Liquidity Builder will become more apparent to those of ordinary skill in the art from the following descriptions of the preferred embodiments.

Figure 1:
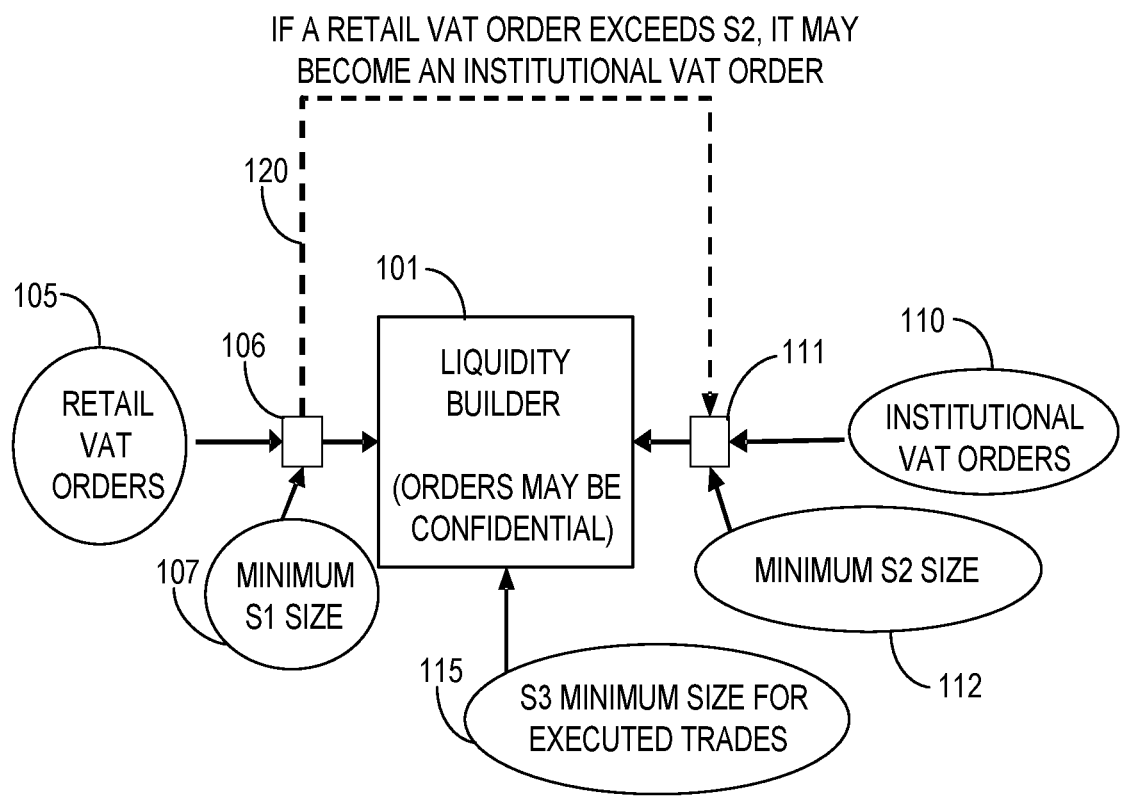
FIG. 1 illustrates a block diagram of an exemplary embodiment of a Volume Attentive Trade (VAT) Liquidity Builder system.

FIG. 1 illustrates a block diagram of an exemplary embodiment 100 of a Volume Attentive Trade (VAT) Liquidity Builder system 101. The VAT Liquidity Builder system 101 may include interconnected computerized equipment, including one or more processors and one or more computer memories, which may include volatile and nonvolatile memory, and instructions, which may include instructions in accordance with methods described herein (e.g., methods 400, 450, 500, and/or 600), for controlling the (VAT) Liquidity Builder system 101, which can include, for example, receiving, queuing, accessing, storing, and processing VAT orders submitted to the system 101 as described herein. The instructions may be implemented using, for example, the Java or C # computer programming languages and using application programming interfaces (API) or other packages for those languages, for example, packages that provide computer networking functionality (e.g., the java.net package from the Java Networking API Specification) and storage (e.g., via the Java Database Connection (JDBC) API), for the transmission, queuing, storage, and/or execution of the VAT orders and related information as described herein.

The computerized equipment and instructions of system 101 may also process data or metadata related to the VAT orders or for the functioning of the system, which can include information regarding VAT order participants and security information such as login, password or other security credentials or accounts for VAT order participants. The Liquidity Builder system 101 may also include a communications port and related networking equipment for establishing one or more connections to a computer network, such as the internet or a private network, to receive, for example, VAT orders or information used by the VAT Liquidity Builder system 101. In some embodiments, the VAT Liquidity Builder system may also include input and output equipment, such as display monitors, keyboards, mice, touch screens, or other such equipment to allow an administrator or other user interact with the VAT Liquidity Builder system, such as change settings or control variables that affect the operation of the VAT Liquidity Builder system.

As described further herein, the VAT Liquidity Builder system 101 may include any number of computers, servers, or computer networking devices including, for example, a server farm located at a centralized location. In another embodiment, the VAT Liquidity Builder system may include a distributed computer network, where the VAT Liquidity Builder system is distributed across a computer network on several computer systems, e.g., servers, mainframes or server farms, and where the several computer systems communicate with each other across the network to aggregate VAT orders. In such an embodiment, the distributed VAT Liquidity Builder system would be able to provide liquidity as if the VAT Liquidity Builder system were a centralized system. In some embodiments, the distributed VAT Liquidity Builder system, or at least portions of it, could be collocated with various VAT Liquidity Builder providers, e.g., banks, brokers, or other investors who provide access to the VAT Liquidity Builder system on behalf of other investors. For example, in some embodiments, instructions for the distributed VAT Liquidity Builder could be installed on the various systems owned by the distributed provider(s). Such instructions may be implemented in various programming languages, including Java or C #, that provide computer networking functionality (e.g., the java.net package from the Java Networking API Specification) and allow the distributed systems to communicate with each other over network 205 as described herein.

In one aspect, the VAT Liquidity Builder system may store one or more VAT orders. In another aspect, VAT orders may be submitted to the VAT Liquidity Builder system by various market participants on a continuous basis at any time, or, in alternative embodiments, at a time or times specified, for example, by an administrator of the VAT Liquidity Builder system. In another aspect, incoming VAT orders may be aggregated and filled according to one or more methods as described further herein.

The types of market participants may include, for example, institutional investors, retail investors (a type of non-institutional investor), or brokers working on behalf of institutional investors, retail investors, individual investors or other types of investors.

In one aspect, the VAT orders of the VAT Liquidity Builder system may be structured as conventional limit orders. In addition, in certain embodiments, each VAT order may include a set of VAT rules. The VAT rules can cause the VAT Liquidity Builder system to operate in specific manners, for example, in accordance with the systems and methods disclosed herein. The VAT rules may include a limit price specifying the maximum or minimum price at which a stock or other security may be bought or sold, respectively. The VAT rules may also indicate the quantity of shares of a position desired to be bought or sold. In some aspects, the VAT rules may further include a VAT Delta. The VAT Delta can be a value that specifies how much above or below the limit price, for a respective buy or sell VAT order, the investor is willing to pay to participate in a trade organized by the VAT Liquidity Builder. In other aspects, a VAT order may also include a set of VAT instructions that can include a specified range of trading prices (e.g., monitored via trades reported on the consolidated tape) for a corresponding VAT order, a yes or no indication as to whether to hold up the VAT order if any trade takes place outside of the specified range, and a yes or no indication to as to whether to automatically release the VAT order if and when the stock trades again within the specified range.

As shown in FIG. 1, VAT orders are aggregated into certain groups when submitted to the VAT Liquidity Builder system. For example, retail VAT orders 105 submitted by retail investors may be aggregated into a first grouping of VAT orders 106. Similarly, as shown, institutional VAT orders 110 may be submitted by institutional investors and aggregated into a second grouping of VAT orders 111.

FIG. 1 shows an embodiment of the VAT Liquidity Builder system with three control variables 107, 112, and 115. Although three control variables are shown, fewer or more variables may be used to control the operation of the system. In the disclosed embodiment, the three variables control the VAT Liquidity Builder system such that the largest, or greatest share quantity, institutional order gets filled first. In certain aspects, an administrator of the Liquidity Builder can adjust the control variables in unison to attract retail and institutional investors who want to trade large orders.

As shown, control variable S1 107 controls the minimum order size (quantity) for retail VAT orders. Similarly, control variable S2 112 controls the minimum order size (quantity) for institutional VAT orders. For both control variables S1 107 and S2 112, if the share quantity associated with a given VAT order is below the respective minimum size, then the VAT order is rejected and not aggregated or otherwise analyzed by the VAT Liquidity Builder system.

Control variable S3 115 controls the minimum size for a trade to execute. For example, in one embodiment, the Liquidity Builder continually analyzes available retail and institutional VAT orders If an aggregated trade could be executed for the minimum S3 115 share quantity (e.g., 10,000 shares) or greater, then the trade is executed. Otherwise, no trade takes place. In another embodiment, for example, an S3 115 minimum order size of 10,000 would require both an aggregated group of one or more retail VAT orders and an aggregated group of one or more institutional VAT orders to each have a total share quantity of 10,000 or more. Otherwise, the trade would be held up until more VAT orders were submitted to reach the required S3 115 minimum size. In other embodiments, the S3 minimum size impacts only one of the two groupings, for example, in an embodiment where S3 affected only retail VAT orders, then a trade would be held up by the VAT Liquidity Builder system in the event that the aggregated retail VAT orders 106 were below the required 10,000 minimum.

In another embodiment, and as shown by the disclosed embodiment of FIG. 1 (item 120), if the share quantity for a retail VAT order exceeds the S2 minimum size of control variable 111, then it may be aggregated with the institutional VAT orders and effectively treated as an institutional order. The administrator may choose to have the VAT Liquidity Builder system implement the optional functionality 120.

Once the retail VAT orders and the institutional VAT orders are aggregated in the VAT Liquidity Builder system, the VAT Liquidity Builder system may fill the orders, for example, by generating an execution command as described herein. The filled orders may result in the trade of stock or securities with respect to the participants who submitted the VAT orders to the VAT Liquidity Builder system.

In some embodiments, for a given stock or other security, the VAT Liquidity Builder System may specify increments for submitting orders, such as 10.01, 10.02, 10.03, etc. In some embodiments, the VAT orders, which may include associated VAT rules, or other information, are kept confidential, such that the VAT orders, VAT rules, or other information, are not publicly disclosed in a public order book or otherwise known to other investors or participants. In this manner, the specified increments for orders in addition to the confidential nature of the VAT orders effectively eliminates the advantage achieved by high frequency traders on stock exchanges with a public order book and permission to submit orders using prices to one tenth of a cent.

Figure 2:
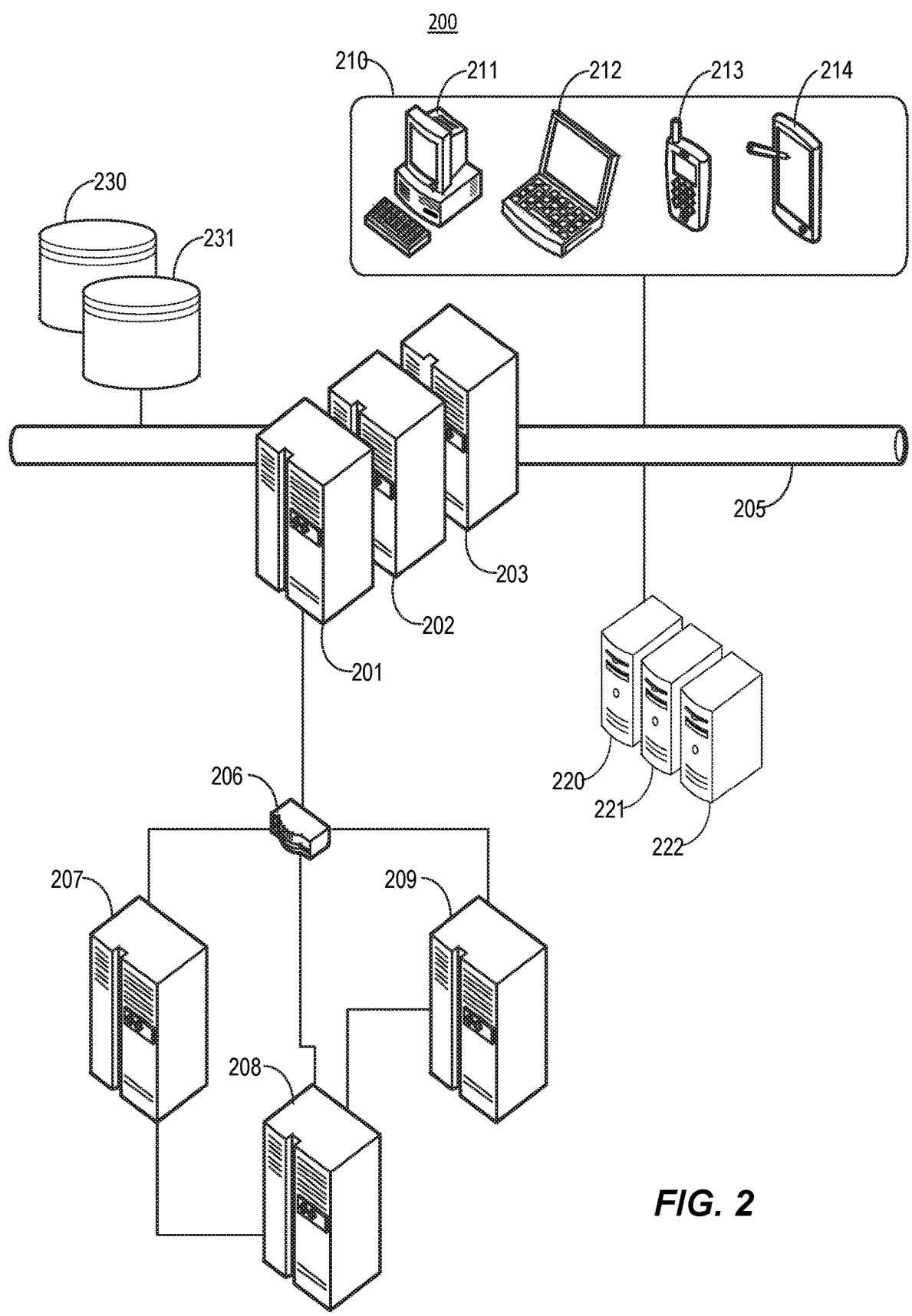
FIG. 2 illustrates a network diagram of an exemplary computer networking system used with the VAT Liquidity Builder system of FIG. 2.

FIG. 2 illustrates a network diagram of an exemplary computer networking system 200 used with the VAT Liquidity Builder system 101 of FIG. 2. In certain embodiments, the VAT Liquidity Builder system 101 may be centrally located, for example, at one or more computer servers or mainframes 201-203. For example, the VAT Liquidity Builder system may be centralized at a stock exchange, central bank, or at any other central provider location. The computer servers 201-203 may be implemented as one or more server farms or other computer equipment co-located at primary location for receiving submitted VAT orders and related information from a computer network 205. The computer servers 201-203 may include one or more processors, memories, computer networking equipment and instructions for receiving, processing and executing VAT orders as described herein.

In other embodiments, the VAT Liquidity Builder system 101 may operate as a distributed system where the VAT Liquidity Builder system 101 is distributed across several servers or mainframes in the computer network. As used herein, VAT Liquidity Builder system 101 may refer to either of the disclosed centralized or distributed system embodiments. For example, the VAT Liquidity Builder system 101 could be distributed across servers 201-203 and distributed servers 207-209 through computer network 206, where computer network 206 can be either a public or private network. In one aspect, the distributed servers can be operated by the same providers, parties, entities or market participants as servers 201-203. In another aspect, the distributed servers can be operated by different providers, parties, entities or market participants as servers 201-203. In another aspect, the distributed servers may be the alternative trading systems, or the servers or computer systems used by the alternative trading systems, provided by various alternative trading system providers, for example, those listed by the U.S. Securities and Exchange Commission.

In one embodiment, the computer servers 201-203 and 207-209 would each aggregate VAT orders for execution as described herein. In another aspect, a particular server, for example, server 201, or a particular group of servers, for example, servers 201-203, could serve as primary server(s) of the distributed system such that non-primary servers, for example, servers 207-209, would relay any VAT orders received by servers 207-209 to primary servers 201-203 for aggregation and execution as described herein. In another aspect, the distributed servers 207-209 can provide pre-processing, such as aggregation and filtering of the VAT orders, according to the methods and systems described herein, before relaying any VAT orders to the primary server(s).

In the distributed embodiment, the distributed system can operate as though it were a centralized system, such that the execution of all VAT orders would occur at the primary server(s), even though the VAT orders were originally submitted and received at a distributed server or system, e.g., any of servers 207-209. In some aspects, the distributed servers 207-209 may transfer VAT orders or related information to each other across the network 206, before relaying the VAT orders, or related information, to the primary server(s), e.g., 201-203.

The servers of the distributed system embodiment may use instructions, including networking instructions, to divide the functionality of the VAT Liquidity Builder system 101, or, at least with respect to some aspects, relay the VAT orders submitted to the distributed servers 207-209 to the primary servers(s) 201-203. In some aspects, the instructions may be installed and maintained on each server based on the server's intended functionality, for example, an administrator may install VAT Liquidity Builder instructions that cause a server, e.g., server 207, to operate as a distributed non-primary server. An administrator may install a different set of VAT Liquidity Builder instructions on server 201 that cause server 201 to operate as the primary server. In such a manner, the servers of a distributed system can be customized to communicate and operate together based on the intended functionality in the distributed system.

The computer network 205 facilitates communication between the VAT Liquidity Builder system 101 and other devices on the network 205. For example, any of the user devices 210 may communicate via the computer network 205 with the VAT Liquidity Builder system 101. User devices 210 may include computer terminal 211, laptop 212, mobile phone 213, tablet device 214 or any other electronic computing device (not shown) connected to network 205. The user devices may have VAT Liquidity Builder software clients installed thereon, that, for example, can provide one or more interfaces used to create, update or submit VAT order(s) to the VAT Liquidity Builder system. The interfaces of the user devices 210 may allow a user to specify or update VAT rules for a specific VAT order. The user devices 210 may be used by brokers and investors, including retail, institutional, and non-institutional investors, to create, submit or update VAT orders and related VAT rules to the VAT Liquidity Builder system 101. The submitted VAT orders may then be aggregated and executed according to the disclosed systems and methods herein.

Institutional investors, or other investors, such as retail investors, making large quantity orders, may also use sophisticated servers, systems or other platforms, for example, servers 220-222, or systems or platforms hosted on servers 220-222, to submit VAT orders. Such servers may host proprietary or customized trading platforms developed by the various institutional investors, or other investors, that are configured to create, submit or update VAT orders to the VAT Liquidity Builder system 101. For example, the proprietary trading platforms may be designed to detect certain macroeconomic trends and trade specific stocks or securities for certain funds, such as mutual funds or exchange traded funds (ETFs), and then create or update one or more related VAT rules associated with one or more new or modified VAT orders that are then submitted to the VAT Liquidity Builder system 101 for execution.

In other embodiments, the institutional investors, or other investors, may simply use tools provided by the operator of the VAT Liquidity Builder system 101. The tools could include instructions designed to interface with the VAT Liquidity Builder system 101 from the institutional investors servers, e.g., 220-222, to allow the servers to submit VAT orders, and other information, such as login information for identification and security purposes for the various participants of the VAT Liquidity Builder system 101. In one aspect, the servers of the institutional investors, e.g., 220-222, may have installed both an alternative trading system platform and the VAT Liquidity Builder system, or at least a portion thereof for, e.g., a distributed VAT Liquidity Builder system, such that the institutional investor servers 220-222 operate as a distributed system that can receive, create, update, or otherwise initiate, VAT orders and relay those orders, for example, to primary VAT servers 201-203.

In some embodiments, the various VAT orders received by the VAT Liquidity Builder system, or other related information, may be stored, either for a short term (e.g., for processing and execution) or a long term (e.g., for record keeping) basis or both. The VAT orders may be stored in the computer memories of the servers, e.g., servers 201-203, 207-209, or 220-222, themselves, or, they may be stored at a remote location in the computer network 205. For example, one or more databases 230-231 may store VAT orders used by the VAT Liquidity Builder system. The databases 230-231 may be collocated with the servers or may be connected via the network 205 such that VAT orders, or other information, are stored externally. In one aspect, the databases 230-231 may be part of a cloud storage service where the VAT Liquidity Builder system interacts, for example, stores and retrieves VAT orders or other information from the databases 230-231 via an application programming interface (API) provided for the cloud service. Such cloud service could be provided by one or more providers of the VAT Liquidity Builder system or by a third party.

In another aspect, the VAT orders and/or related information may be recorded using block-chaining technology implemented, for example, by databases 230-231 or servers of computer network 200, such that records for each executed VAT order is maintained by time-stamping and linking each VAT order, or a record representing each VAT order, in an order of chronological occurrence. In such a block-chained system, each database or server that submits, receives, stores or otherwise transacts with a VAT order may keep a copy of the VAT order records so that a possible dispute with respect to VAT order executions, transactions, timings or otherwise can be reconciled by comparing the various VAT order records of each of the block-chain systems.

FIGS. 3A and 3B show exemplary embodiments of various VAT orders. FIG. 3A illustrates a table depicting an exemplary grouping of retail VAT orders 301 that may be aggregated in the VAT Liquidity Builder system. The Liquidity Builder system can use rules specified for each of the VAT orders 301 that, together and with the VAT orders 351, control the operation of the VAT Liquidity Builder system and the execution of the VAT orders. In actual operation, retail and institutional VAT orders can be on both the buy and sell sides.

The embodiment of FIG. 3A shows a grouping of aggregated retail VAT orders 301 indicating respective VAT order investors (e.g., a certain type of VAT Liquidity Builder system participants) that want to "Buy" a given stock or security. In some embodiments, the VAT orders 301 are aggregated into the VAT Liquidity Builder system in no particular sequence or ordering.

In the current embodiment, column 302 identifies a retail VAT Liquidity Builder system investor, or otherwise participant, that submitted the VAT order. For example, a VAT order submitted by Investor A appears in the first row of the FIG. 3A table, i.e., "VAT order A." Column 303 shows the quantity of shares for each of the aggregated VAT orders 301. In the example for Investor A, investor A has indicated that VAT order A is to buy 20,000 shares of a given stock or security. Column 303 shows the limit price for each of the aggregated VAT orders 301. For example, VAT order A has a limit price of $10.03. Column 304 shows the VAT Deltas for each of the aggregated VAT orders 301. The VAT Deltas are values that specify how much above or below a limit price an investor is willing to pay to participate in a trade organized by the VAT Liquidity Builder. For example, because VAT order A is a buy order, the VAT Delta of $0.03 indicates how much above the limit price investor A is willing to pay to participate in a trade. Column 305 shows the highest price at which the investor is willing to pay, e.g., in this example, willing to buy, to participate in trade organized by the VAT Liquidity Builder, where, in the example of FIG. 3A, column 305 shows the limit price of column 303 summed with the VAT Delta of column 304 to produce the value of column 305, which, may be referred to as the effective limit price.

In other embodiments, the effective limit price may be determined in other ways, for example as a function of the number of shares the investor gets filled in a VAT trade, or, as some multiple of the limit price and VAT Delta or by some computerized function that uses the limit price and VAT Delta, or other values, as input parameters and that returns the effective limit price as an output parameter value of the function. In certain aspects, the VAT Liquidity Builder system provides a self-reinforcing, dynamic process that can operate at two levels to build liquidity via adjustments to the effective limit price. First, a single retail investor can increase or decrease the VAT Delta to cause more or less shares, respectively, to be filled in a trade. For example, the VAT Delta can be dynamically determined by increasing (decreasing) the VAT Delta value as more (less) shares would be filled in a trade. In some aspects, the VAT Delta may be updated for a given VAT order as described herein, for example, by an investor making a request to update the VAT Delta for a given VAT order that the investor had previously submitted to the VAT Liquidity Builder system. In other aspects, the VAT Delta may be updated via a request where the investor provides instructions to update the VAT Delta, for example, where the instructions would cause the VAT Liquidity Builder system to vary or update the VAT Delta for a given order based on how a trade performs, the number shares of a particular institutional order, the number of shares for a particular trade including multiple orders, how many of the investor's desired shares from the original VAT order are filled in a trade, or by any other metrics of the trade, or by analyzing other VAT orders or trades in the VAT Liquidity Builder system. In one example embodiment, an investor may submit a VAT order for 10,000 shares, with a VAT Delta of 0.04 and with instructions to allow the VAT Delta to vary. Accordingly, in the following example, the VAT Delta instructions could allow the VAT Liquidity Builder system to execute a VAT trade that filled the following number of the shares according to variable VAT Delta instructions: VAT Delta of 0.04 for a trade of 7,500 to 10,000 shares; VAT Delta of 0.03 for a trade of 5,000 to 7,499 shares; VAT Delta of 0.02 for a trade of 2,500 to 4,999 shares; and a VAT Delta of 0.01 for a trade of less than 2,500 shares. Accordingly, the investor's original VAT order of 10,000 shares could be filled using higher VAT Deltas for larger fills and vice versa. Second, similar actions by other participating retail investors can contribute to an even larger aggregate trade.

In some embodiments, each of the share quantity, limit price, VAT Delta and effective limit price for a VAT order, for example, VAT order A, may be associated with a set of VAT rules for a given VAT order. Thus, for example, a set of VAT rules for VAT order A may be created where the VAT rules for VAT order A have a share quantity, a limit price, a VAT Delta and an effective limit price equals to the values as shown in the first row for Investor A of FIG. 3A. In other embodiments, additional information for a VAT order may be included in the set of VAT rules. In other embodiments, less information is include in the VAT rules, for example, in one embodiment only the share quantity, limit price and VAT Delta are included such that the effective limit price can be later determined from the limit price and VAT Delta based on a particular method, as described herein, specified by the VAT Liquidity Builder at or near the time of execution of a particular trade.

FIG. 3B illustrates a table depicting an exemplary grouping of institutional VAT orders 351 that may be aggregated in the VAT Liquidity Builder system of FIG. 1. The Liquidity Builder system can use rules specified for each of the VAT orders 351 that, together and with the VAT orders 301, control the operation of the VAT Liquidity Builder system and the execution of the VAT orders.

The embodiment of FIG. 3B shows a grouping of aggregated institutional VAT orders 351 indicating respective institutional VAT order investors (e.g., a certain type of VAT Liquidity Builder system participants) that want to "Sell" a given stock or security. In some embodiments, the VAT orders 301 are aggregated into the VAT Liquidity Builder system in no particular sequence or ordering.

In the current embodiment, column 352 identifies an institutional VAT Liquidity Builder system investor, or otherwise participant, that submitted the VAT order. For example, a VAT order submitted by Investor D appears in the first row of the FIG. 3B table, i.e., "VAT order D." Column 352 shows the quantity of shares for each of the aggregated VAT orders 351. In the example for Investor D, investor D has indicated that VAT order D is to sell 40,000 shares of a given stock or security. Column 353 shows the limit price for each of the aggregated VAT orders 351. For example, because VAT order D is a type of sell order that has a limit price of $10.06, the limit price of VAT order D shows the lowest price at which investor D is willing to sell the related stock or security via the VAT Liquidity Builder system.

VAT orders need not be created, transmitted, stored or otherwise used in a tabular format as depicted for the embodiments of FIGS. 3A and 3B. In other embodiments, VAT orders may be created, transmitted, stored, or otherwise used in any form of data structure, including, for example, using a standard or proprietary extensible markup language (XML) format, a JavaScript Object Notation (JSON) format, a text file format, a relational database format, a NoSQL database format, or any other data structure, format or transport for preparing, creating or updating the VAT orders and/or related rules for submission to and/or aggregation with the VAT Liquidity Builder system.

The VAT orders may also be aggregated into other groupings other than the Retail VAT Buy orders or Institutional VAT Sell orders as shown in FIGS. 3A and 3B. For example, other VAT order classifications or types of aggregated VAT orders may include Retail VAT Sell orders (e.g., where retail investors submit VAT orders indicating a desire to sell shares of a particular stock or security), Institutional VAT Buy orders (e.g., where institutional investors submit VAT orders indicating a desire to buy shares of a particular stock or security), a non-institution VAT order, e.g., indicating a desire to either buy or sell a particular stock or security, or any other VAT order, from any other grouping of investor classification, type or VAT Liquidity Builder participant, desiring to buy or sell stock or securities via the VAT Liquidity Builder system.

Figure 4A:
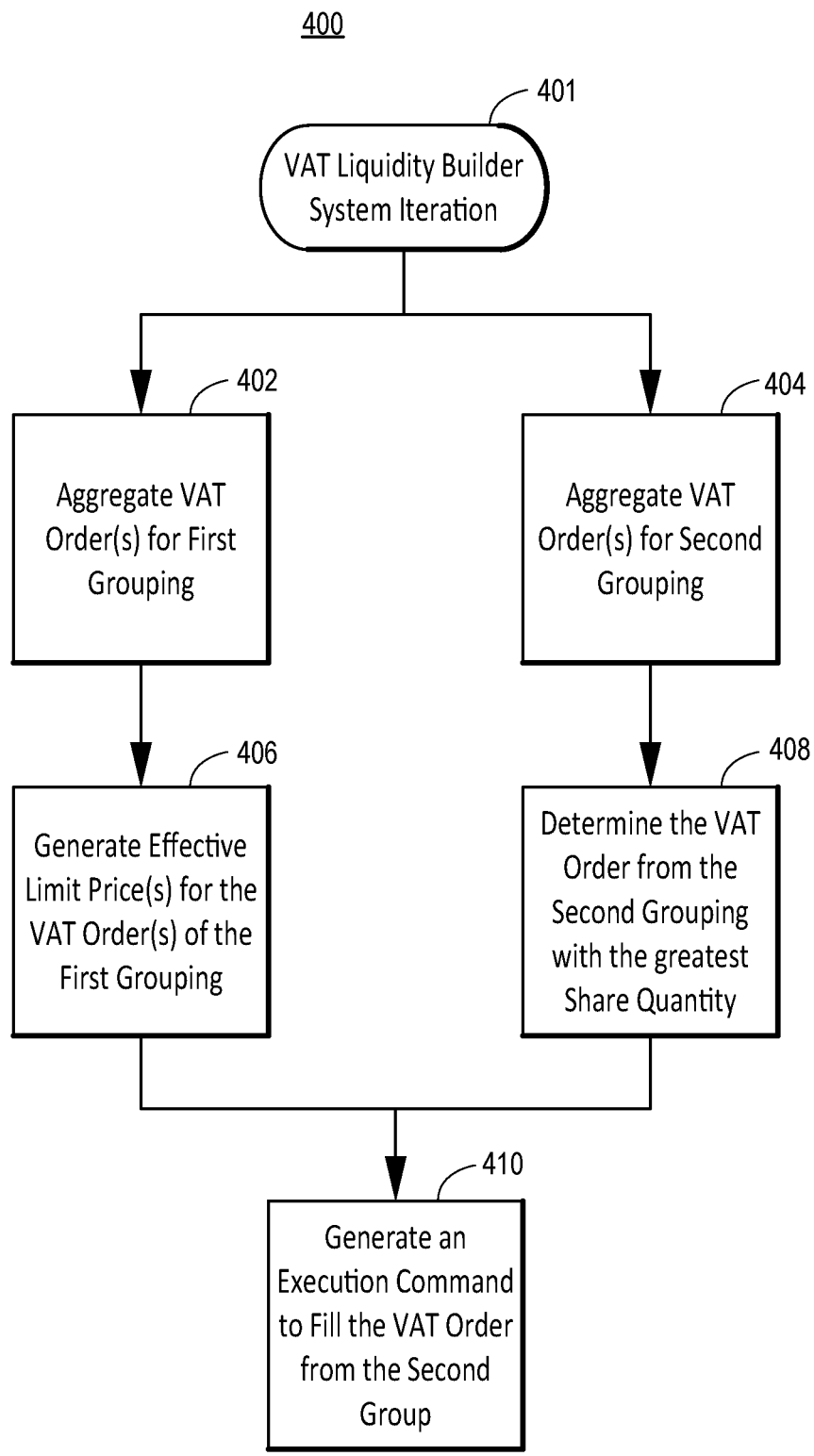
FIGS. 4A and 4B illustrate a flow diagrams depicting example methods used to generate respective execution commands to fill at least one VAT order from a specific group with respect to each method.

FIG. 4A illustrates a flow diagram depicting an example method 400 that may be used by the VAT Liquidity Builder system to generate an execution command to fill, or partially fill, at least one VAT order from a specific VAT order grouping. In block 401, the VAT Liquidity Builder system may be configured to aggregate and fill VAT orders in an iterative fashion, such that the VAT Liquidity Builder system provides a dynamic platform that continuously aggregates incoming VAT orders for execution. The VAT Liquidity Builder system may use VAT rules associated with the various aggregated VAT orders to control the operation of the VAT Liquidity Builder system and determine the execution sequence of the VAT orders, as further described below.

At block 402 the VAT Liquidity Builder system may aggregate one or more VAT orders for a first grouping. The first grouping can include, for example, VAT orders grouped by or otherwise associated with particular types of VAT Liquidity Builder investors or participants including, for example, retail investors or other non-institutional investors. Each of the one or more VAT orders for the first grouping may include a first set of VAT rules, where the first set of VAT rules can define a limit price, a share quantity, and a VAT delta.

At block 404, either simultaneously with, before or after, the functionality for block 401, the VAT Liquidity Builder system may aggregate one or more VAT orders for a second grouping. In one aspect, as mentioned further below with respect to FIG. 4B, the second grouping may include one or more VAT orders aggregated into specific tranches based on limit prices. In addition, the second grouping can include, for example, VAT orders grouped by or otherwise associated with particular types of VAT participants including, for example, institutional investors. In other aspects, VAT orders of non-institutional investors may be aggregated with the second grouping where, for example, a VAT order of a non-institutional investor has a share quantity that exceeds a threshold quantity. Each of the VAT orders for the second grouping may include, for example, a second set of VAT rules, where the second set of VAT rules can define a limit price and a share quantity.

At block 406, the VAT Liquidity Builder system may generate effective limit prices for each of the respective VAT orders for the first grouping. The effective limit price may be generated from the limit price and the VAT delta from the first set of VAT rules associated with the one or more VAT orders for the first grouping.

At block 408, the VAT Liquidity Builder system determines which VAT order has the greatest share quantity with respect to the other VAT orders aggregated with the second grouping. The VAT Liquidity Builder system may then analyze the VAT rules associated with each of the VAT orders in the second grouping to determine the VAT order that has the greatest share quantity.

Figure 4B:
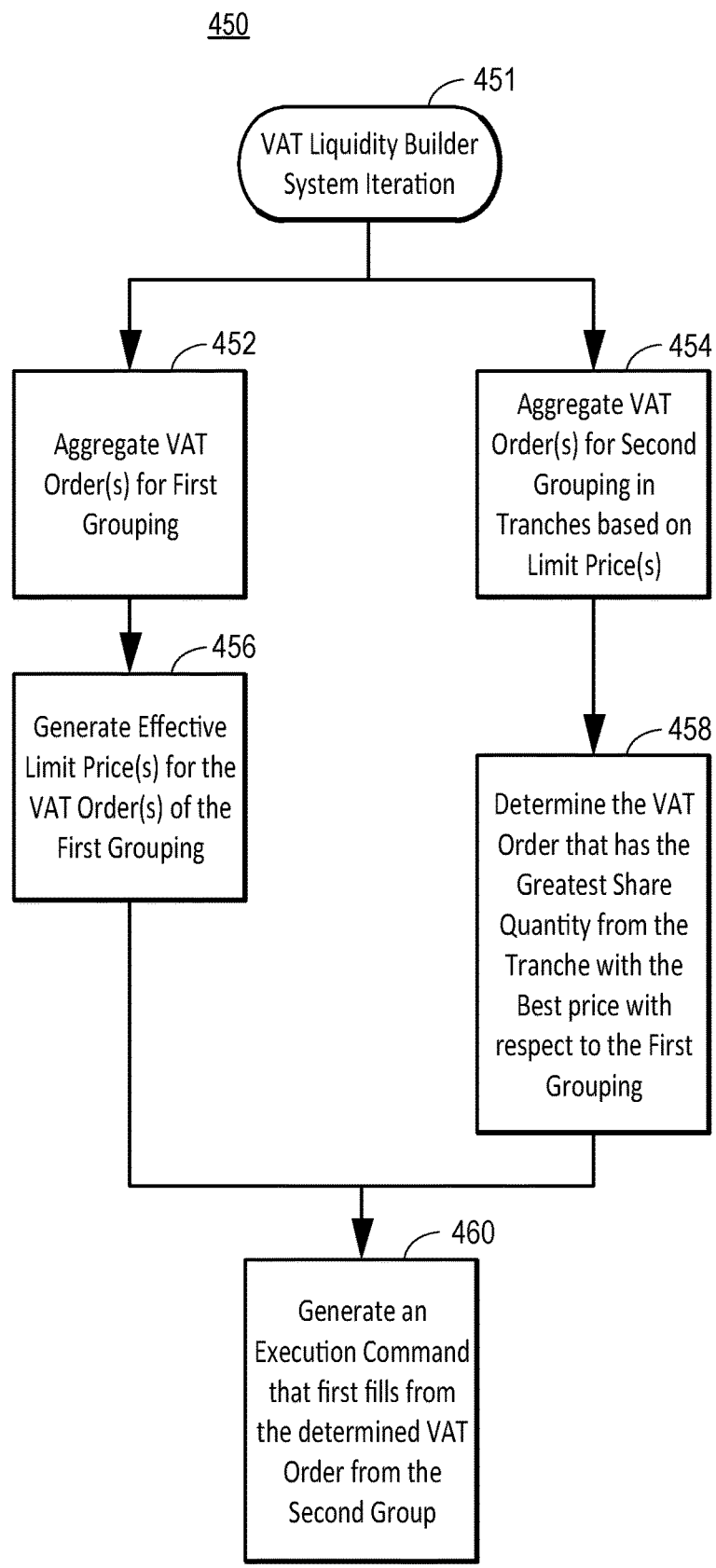

At block 410, the VAT Liquidity Builder system may generate an execution command to fill the greatest share quantity VAT order of the second grouping with one or more VAT orders from the first grouping, such that the one or more VAT orders from the first grouping are also filled, or at least partially filled, as a consequence of filling the greatest share quantity VAT order of the second grouping. FIG. 4B depicts an alternate method 450 that may be used by the VAT Liquidity Builder system to generate an execution command to fill, or partially fill, at least one VAT order from a specific VAT order grouping. The method 450 is similar in some respects to the method 400, with blocks 451, 452 and 456 corresponding to blocks 401, 402 and 406, respectively, and, accordingly, these blocks will not be described again with respect to FIG. 4B. In method 450, at block 454 the VAT order(s) for the second grouping are aggregated in tranches based on limit prices. For example, a first tranche of VAT orders aggregated into the second grouping could include VAT orders having VAT Rules indicating a limit price of $10.05. A second tranche of VAT orders aggregated into the second grouping could include VAT orders having VAT rules indicating a limit price of $10.06, and so on. In block 458, for the second grouping, the VAT Liquidity builder system determines which VAT order has the greatest share quantity with respect to the other VAT orders in each tranche based on limit price. At block 460, the VAT Liquidity Builder System may generate an executing command to fill the determined greatest share quantity VAT order of the second grouping from the tranche with the best price from the perspective of orders in the first grouping. As such, one or more VAT orders from the first grouping are filled, or at least partially filled, as a consequence of filling the greatest share quantity VAT order of the second grouping of a particular tranche.

For either of the methods 400 or 450, the VAT rules of each of the VAT orders of the first grouping are analyzed by the VAT Liquidity Builder system to determine which of VAT orders of the first grouping, if any, qualify for trade by having a respective effective limit price that equals or overlaps with the limit price of the VAT order of the second grouping having the greatest share quantity. If the effective limit price(s) of any of the VAT orders of the first grouping qualify, then the execution command causes the shares of the greatest share quantity VAT order of the second grouping to be filled with those qualifying VAT orders of the first grouping.

For example, the VAT order D of FIG. 3B indicates a share quantity of 40,000. In an embodiment where institutional VAT orders 351 where aggregated into the second grouping of the VAT Liquidity Builder system, VAT order D would be identified as the greatest share quantity VAT order of the second grouping in accordance with block 408 of FIG. 4A. If retail VAT orders 301 were aggregated into the first grouping of the VAT Liquidity Builder system, then VAT order A would be identified as a possible order be filled against VAT order D because VAT order A has an effective limit price (column 305) of $10.06 that is equal to the limit price of VAT order D, and, for some embodiments, because VAT order A has the greatest share quantity of the first group. If VAT order A were filled by trading the 20,000 shares of the stock or security of VAT order A with 20,000 shares of the same stock or security of VAT order D, VAT order D would have 20,000 shares remaining to be filled, such that the VAT Liquidity Builder system would continue the current iteration, for example, at block 410, until VAT order D was filled with any remaining VAT orders from the first grouping, e.g., in order of largest share quantity first, for example, VAT order C followed by B.

In some embodiments, the VAT order D would be filled with VAT orders of the first group having the highest effective limit price, and, in further aspects, afterwards with VAT orders of the first grouping having the greatest share quantity. In such an embodiment, VAT order D would be partially filled with the 15,000 shares of VAT order C because VAT order C has a higher effective limit price ($10.07) than either VAT order A ($10.06) or B ($10.06), leaving VAT order D with 25,000 remaining shares to be filled. The remaining shares of VAT order D may then be filled with 20,000 shares from VAT order A (since VAT order A has a greater share quantity than VAT order B) and then 5,000 shares from VAT order B, thereby completing filling VAT order D (all 40,000 shares) of investor D.

Once filling VAT order D, the VAT Liquidity Builder system would then continue to a new iteration, back to block 401 of FIG. 4A, to identify the next VAT order of the second grouping having the greatest share quantity. In the present example, VAT order E would be identified as the greatest share quantity VAT order of the second grouping in accordance with block 408 of FIG. 4A. VAT order E would then be filled, at least partially, with any VAT orders queued in the first grouping of aggregated VAT orders. In the present example, VAT order E would be partially filled with the remaining 5,000 shares of VAT order B, because the effective limit price of VAT order B equals the limit price of VAT order E. The VAT Liquidity Builder would fill the remaining shares of VAT order E with any new or updated VAT orders submitted to the VAT Liquidity Builder system that are aggregated with the first group and that have a sufficient effective limit price.

In some aspects, as described herein, the new VAT orders may be submitted, received, and analyzed by the VAT Liquidity builder system at any time such that the VAT orders of the first grouping are continuously ranked according to effective limit price and/or share quantity such that the greatest effective limit price and/or greatest share quantity VAT orders of the first grouping get filled against the greatest share quantity VAT order of the second grouping first. In such an embodiment, the VAT Liquidity Builder system could be configured to prioritize the aggregated VAT orders of the first group such that the greatest effective limit price VAT order and/or greatest share quantity from the first group are filled before any other VAT orders of the first group.

In other aspects, as described in the above example, the new VAT orders may be submitted at any time such that the VAT orders of the first grouping are continuously ranked according to share quantity such that the greatest share quantity VAT order gets filled against the greatest share quantity VAT order of the second grouping first. In such an embodiment, the VAT Liquidity Builder system could be configured to prioritize the VAT orders of the first group such that the greatest share quantity VAT order from the first group are filled before any other VAT orders of the first group.

In other aspects, as described in the above example, the VAT Liquidity Builder system is configured to first prioritize VAT orders of the first group by effective limit price and then by share quantity, thereby creating a double sort order or order of preference for filling the VAT orders from the first group with shares of the greatest quantity VAT order of the second group.

In another aspect, the VAT Liquidity Builder system may aggregate VAT orders based on a minimum share quantity. In such an embodiment, a new VAT order is aggregated with the first group if the new order is below the minimum share quantity but is otherwise aggregated with the second group if above or equal to the minimum share quantity.

In another aspect, the VAT rules associated with the VAT orders submitted to the VAT Liquidity Builder system further define a set of VAT instructions. The set of VAT instructions can include a specified range of execution prices for a corresponding VAT order and an indication as to whether to suspend the execution command, for example, at block 410 of FIG. 10, for the corresponding VAT order if the limit price associated with the corresponding VAT order is not within the specified range of execution prices. The VAT instructions may also include an indication as to whether to automatically resume a suspended execution command for the corresponding VAT order if the limit price associated with the corresponding VAT order is within the specified range of execution prices. In this way, an investor may submit a VAT order that controls the VAT Liquidity Builder system such that the VAT order is not executed unless a desired market price indicated by the specified range is realized.

In other aspects, the VAT rules associated with the VAT orders are kept confidential such that the VAT orders, their VAT rules, or information therein, are not publically disclosed or otherwise accessible to any other investors, such as high frequency traders, or any other participants of the VAT Liquidity Builder system.

Figure 5:
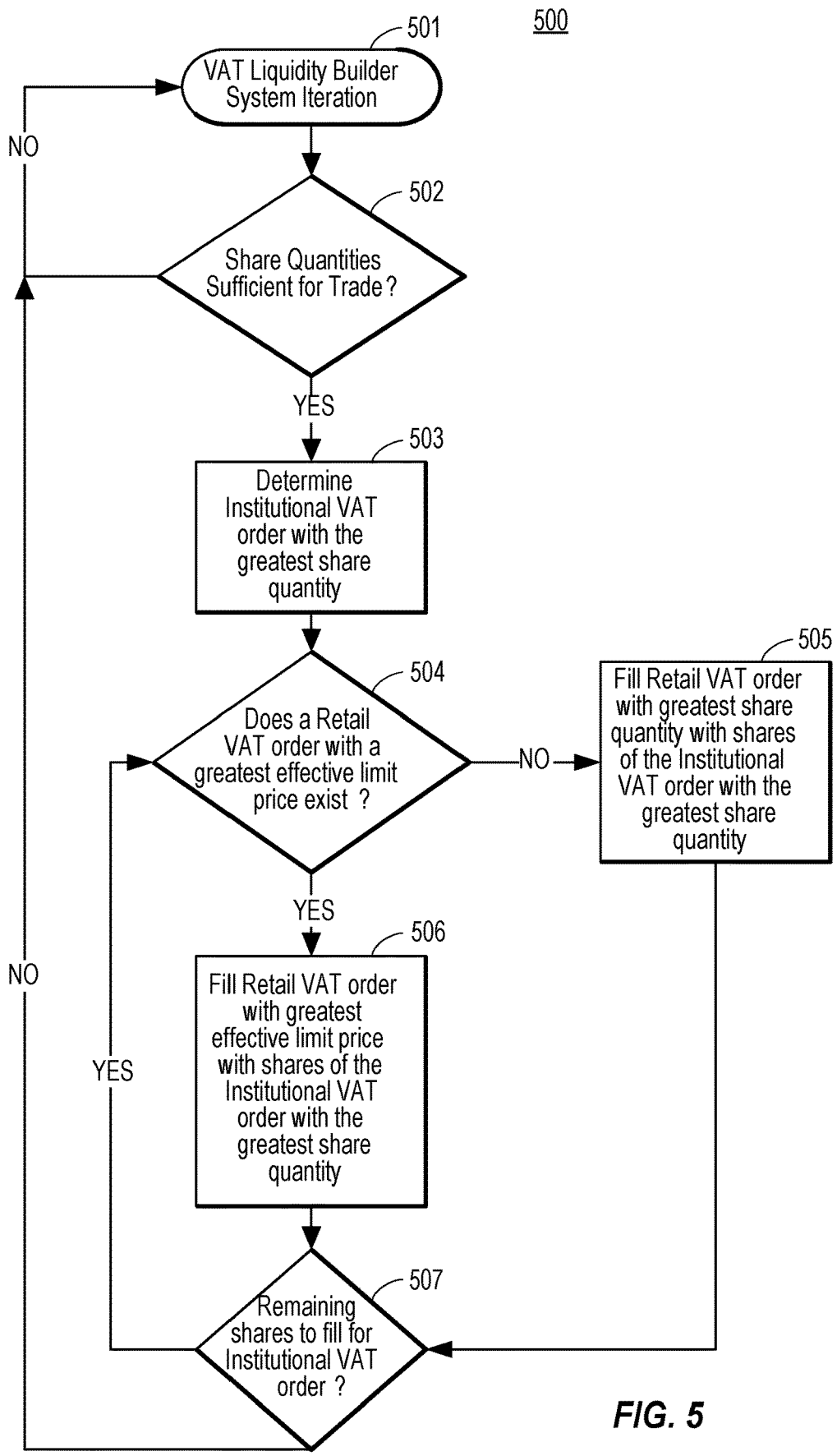
FIGS. 5 and 6 illustrate flow diagrams depicting embodiments of iterative decision methods that may be used by the VAT Liquidity Builder systems of FIG. 1 or 2.

FIG. 5 illustrates a flow diagram depicting an embodiment of an iterative decision method 500 that may be used by the VAT Liquidity Builder system of FIG. 1. The VAT Liquidity Builder system may operate continuously such that the aggregated VAT orders of the system may be considered in an iterative process (block 501) at any point in time. For example, the VAT Liquidity Builder system may receive VAT orders of various types (e.g., buy or sell) submitted from various types of investors or VAT Liquidity Builder participants across network 205 and aggregate the VAT orders into first and second groupings as described herein. The VAT Liquidity Builder system may implement one or more interactive methods, at the same time and continuously, to facilitate each of the various types of investors and related VAT orders submitted to the system.

For example, as shown for the VAT Liquidity Builder system embodiment 100 of FIG. 1, a first grouping may be associated with VAT orders from retail investors and a second grouping may be associated with VAT orders from institutional investors. The iterative process (block 501) may analyze any number or type of VAT orders submitted and aggregated in the system, for example, the VAT orders shown in FIGS. 3A and 3B.

At block 502, the VAT Liquidity Builder system may determine whether there are sufficient quantities of shares aggregated in the system for a trade to occur. In one embodiment, for example, the VAT Liquidity Builder system continually analyzes the share quantities and the limit prices associated with the VAT orders for both retail and institutional orders. If a trade could be executed that aggregated multiple retail VAT orders according to Liquidity Builder rules described herein for a total number of shares equal or greater than the control variable S3 115 (depicted in FIG. 1), the conclusion (at block 502) would be that the share quantities are sufficient for a trade. For example, the VAT Liquidity Builder system can determine that many retail VAT orders in the system could instantaneously be matched with a few institutional VAT orders in the system that could result in a single trade of significant size. In another embodiment, control variable S3 115 may be used to make the determination, where S3 is set to a minimum trade quantity of 10,000 shares. As shown for the embodiments of FIGS. 3A and 3B, the aggregated retail VAT orders 301 have an aggregated share quantity of 45,000 and the institutional VAT orders 351 have an aggregated share quantity of 75,000. Because the aggregated VAT orders, i.e., the aggregated retail VAT orders 301 and the aggregated institutional VAT orders 351, each have aggregated share quantities exceeding 10,000, then both exceed the S3 minimum. In other embodiments, the S3 minimum requirement would apply to only one grouping of VAT orders, for example, in one embodiment only the aggregated retail VAT orders 301 of the first group would need to exceed the S3 minimum in order to satisfy the requirement of block 502. In another embodiment, at block 502, the VAT Liquidity Builder system may also aggregate shares, and determine share quantity, further based equal or overlapping effective limit prices of the retail VAT orders compared with the limit prices of the institutional VAT orders. In such an embodiment, at block 502, for a given institutional VAT order, the VAT Liquidity Builder system would only consider the aggregated share quantities of retail VAT orders having an effective limit price equal to or overlapping with the limit price the given institutional VAT order. For example, for the VAT orders shown in FIGS. 3A and 3B, institutional VAT order D has a limit price of $10.06. Thus, in the present embodiment, only retail VAT orders having an effective limit price of $10.06 or higher would be considered for trade with VAT order D. Because each of retail VAT orders A, B and C meet the criteria, then each of the share quantities of VAT orders A, B and C (a total of 45,000 shares) would be considered together for trade. If another retail VAT order, e.g., retail VAT order M (not shown) were aggregated with the VAT Liquidity Builder, where VAT order M had an effective limit price of $10.05, then VAT order M, because its effective limit price did not overlap with VAT order D's limit price, would not be considered for trade with VAT order D such that VAT order M's share quantity (regardless of size) would not contribute to overcoming the S3 minimum.

If the share quantity meets the required minimum for trade, the method proceeds to block 503. Otherwise, the VAT Liquidity Builder system cycles back to block 501 for a new iteration to consider any newly submitted VAT orders or any changes to currently existing aggregated VAT orders in the system.

In some aspects, the VAT Liquidity Builder system may allow investors or VAT Liquidity Builder participants to update existing VAT orders previously submitted and aggregated with the VAT Liquidity Builder system, for example, by sending a replacement VAT order that removes the existing VAT order from the system and updates the system with the replacement VAT order, or by sending replacement VAT rules that would update the respective VAT rules of a related VAT order.

If there are sufficient share quantities, then, at block 503, the VAT Liquidity Builder system analyzes the VAT rules of the aggregated institutional VAT orders 351 to determine the particular institutional VAT order that has the greatest share quantity. In some embodiments, the VAT Liquidity Builder system, at block 503, analyzes the VAT rules of the aggregated institutional VAT orders 351 to determine the particular institutional VAT order that has the greatest share quantity from the tranche with the best price with respect to the retail VAT order(s), e.g., retail VAT orders 301. In method 500, the institutional VAT order with the greatest quantity share size is always executed first. In one aspect, such an arrangement can further advance the incentive for institutional investors to submit larger orders to the VAT Liquidity Builder system. In one embodiment, where two institutional VAT orders specify the same share quantity, then the institutional VAT order that has the "best" limit price (e.g., in the current example, where a new institutional VAT order F has a share quantity of 40,000, but a lower limit price of $10.05 compared with $10.06 VAT order E), then the institutional VAT order with the best limit price (e.g., VAT order F) order would be executed first.

In the current example, the best price is the lowest price because the institutional VAT orders 351 are "sell" orders, where the best price is be determined from the perspective of the party on the other side of the trade. In other embodiments, institutional VAT orders may be "buy" VAT orders, such that the best price would be the highest price. In such an embodiment, the retail VAT orders would be "sell" VAT orders.

Although method 500 is disclosed using the exemplary retail Buy VAT Orders and institutional Sell VAT Orders of FIGS. 3A and 3B, respectively, the VAT Liquidity Builder system may also fill orders with retail Sell VAT orders and institutional Buy VAT orders, where the greatest quantity institutional orders are still executed first, but, instead the VAT Liquidity Builder system fills the order by buying shares for the institutional investor associated with given institutional Buy VAT orders instead of selling the shares.

In some aspects, the VAT Liquidity Builder system runs multiple processes at the same time allowing various different aggregated groupings of buy and sell VAT orders to trade simultaneously. For example, the VAT Liquidity Builder system would allow trades of retail Sell VAT orders against institutional Buy VAT orders, retail Buy VAT orders against institutional Sell VAT orders, non-institutional Buy VAT orders against institutional Sell VAT orders and vice versa, etc. Each of the grouping could trade simultaneously, and according to the aggregation and grouping configured, e.g., by an administrator, or otherwise determined by the VAT Liquidity Builder system.

In the example where the institutional VAT orders 351 are analyzed by the VAT Liquidity Builder system, institutional VAT order D would be determined for execution first because its 40,000 shares is bigger than institutional VAT order E's 35,000 shares.

At block 504, the VAT Liquidity Builder system next analyzes the VAT rules of the aggregated retail VAT orders 301 to determine whether a particular retail VAT order has a greatest effective limit price of the group. In the current example, because retail VAT order C has the greatest effective limit price of $10.07, and because the greatest effective limit price equals or exceeds the limit price for VAT order D ($10.06), and, therefore is qualified for trade, the method 500 proceeds to block 506 where the VAT Liquidity Builder system fills retail VAT order C first by executing a command to trade the 15,000 shares of retail VAT order C with 15,000 shares of institutional VAT order D at the limit price of $10.06. In other embodiments, the trade may be filled at the effective limit price of $10.07.

At block 507, the VAT Liquidity Builder system next determines whether the present institutional VAT order has remaining shares to fill. In the current example, VAT order D has 25,000 remaining shares after filling the 15,000 shares of retail VAT order C. Accordingly, the VAT Liquidity Builder system cycles back to block 504 and analyzes any remaining (or, in some embodiments, newly submitted or updated) retail VAT orders aggregated in the system. In the present example, of the aggregated retail VAT orders 301, retail VAT orders A and B remain. By analyzing the VAT rules of retail VAT orders A and B (block 504); the VAT Liquidity Builder system determines that both orders have the same effective limit price.

Accordingly, in method 500, where a greatest effective limit price retail VAT order cannot be determined, the VAT Liquidity Builder system next analyzes the VAT rules of the aggregated retail VAT orders in the system to determine the particular VAT order having the greatest share quantity of the group. In the current example, because remaining retail VAT orders A and B have the same effective limit price ($10.06), and because retail VAT order A has the greatest share quantity (20,000 shares) when compared to VAT order B (10,000 shares), and because VAT order A has an effective limit price that equals or exceeds the limit price for VAT order D ($10.06), and, is therefore qualified for trade, the method 500 proceeds to block 505 where the VAT Liquidity Builder system fills retail VAT order A by executing a command to trade the 20,000 shares of retail VAT order A with 20,000 shares of institutional VAT order D.

In the current example, at block 507, the VAT Liquidity Builder system determines that VAT order D has 5,000 remaining shares after filling the 20,000 shares of retail VAT order A. Accordingly, the VAT Liquidity Builder system cycles back to block 504 and analyzes any remaining (or, in some embodiments, newly submitted or updated) retail VAT orders aggregated in the system. In the current example, of the aggregated retail VAT orders 301, retail VAT order B remains. As the only remaining VAT order, VAT order B has the greatest effective limit price by default. Accordingly, because VAT order B's effective limit price ($10.06) equals or exceeds the limit price for VAT order D ($10.06), the method 500 proceeds to block 506 where the VAT Liquidity Builder system partially fills retail VAT order B by executing a command to trade 5,000 shares of retail VAT order B with the remaining 5,000 shares of institutional VAT order D.

At block 507, the VAT Liquidity Builder system determines that institutional VAT order D has been completely filled. Accordingly, the VAT Liquidity Builder system cycles back to block 501 to begin a new iteration. In the subsequent iterations, for example, the remaining 5,000 shares of retail VAT order B do not equal the S3 minimum (block 502). Thus, the VAT Liquidity Builder system would continue to cycle between blocks 501 and 502 until the sufficient share quantity, as determined by S3, was met, for example, by aggregating newly submitted retail VAT orders or by the share quantity of existing VAT orders (e.g., VAT order B) being updated to a quantity that exceeds the S3 minimum.

In an embodiment where the S3 control variable was set to 5,000 shares, then, where only VAT orders B and E remained according to the above example, then the method 500 would proceed through blocks 502 to 507, as described above, where the VAT Liquidity Builder system would fill the retail VAT order B by executing a command to trade the remaining 5,000 shares of retail VAT order B with the 5,000 shares of institutional VAT order E. In the current example, institutional VAT order E would have 30,000 shares remaining and would cycle back to block 504 where the VAT Liquidity Builder system would fill the remaining shares of institutional VAT order E with new or updated VAT orders submitted to the system, in accordance with method 500, as described above.

In some embodiments, once all the institutional VAT orders are exhausted, the VAT Liquidity Builder system may fill retail VAT orders against one another. For example, one or more retail VAT orders to sell a given stock or security may be filled against one or more other retail VAT orders to buy the same stock or security. In one aspect, in accordance with method 500, retail VAT orders having the greatest quantity and/or greatest effective limit price would be filled first.

As contemplated herein, in some embodiments, an order execution can involve all institutional VAT orders on one side of the trade and all retail VAT orders on the other side. Other variations include retail and institutional VAT orders on both sides of the entire trade. For example, institutional VAT orders may be filled against one another, e.g., according to method 500, where a first grouping of aggregated institutional orders is filled against a second grouping of aggregated VAT orders. In such an embodiment, the VAT Liquidity Builder system would process the first grouping of aggregated institutional orders in the same manner as the retail VAT orders of method 500 and the process the second grouping of aggregated institutional orders in the same manner as the institutional VAT orders of method 500.

Figure 6:
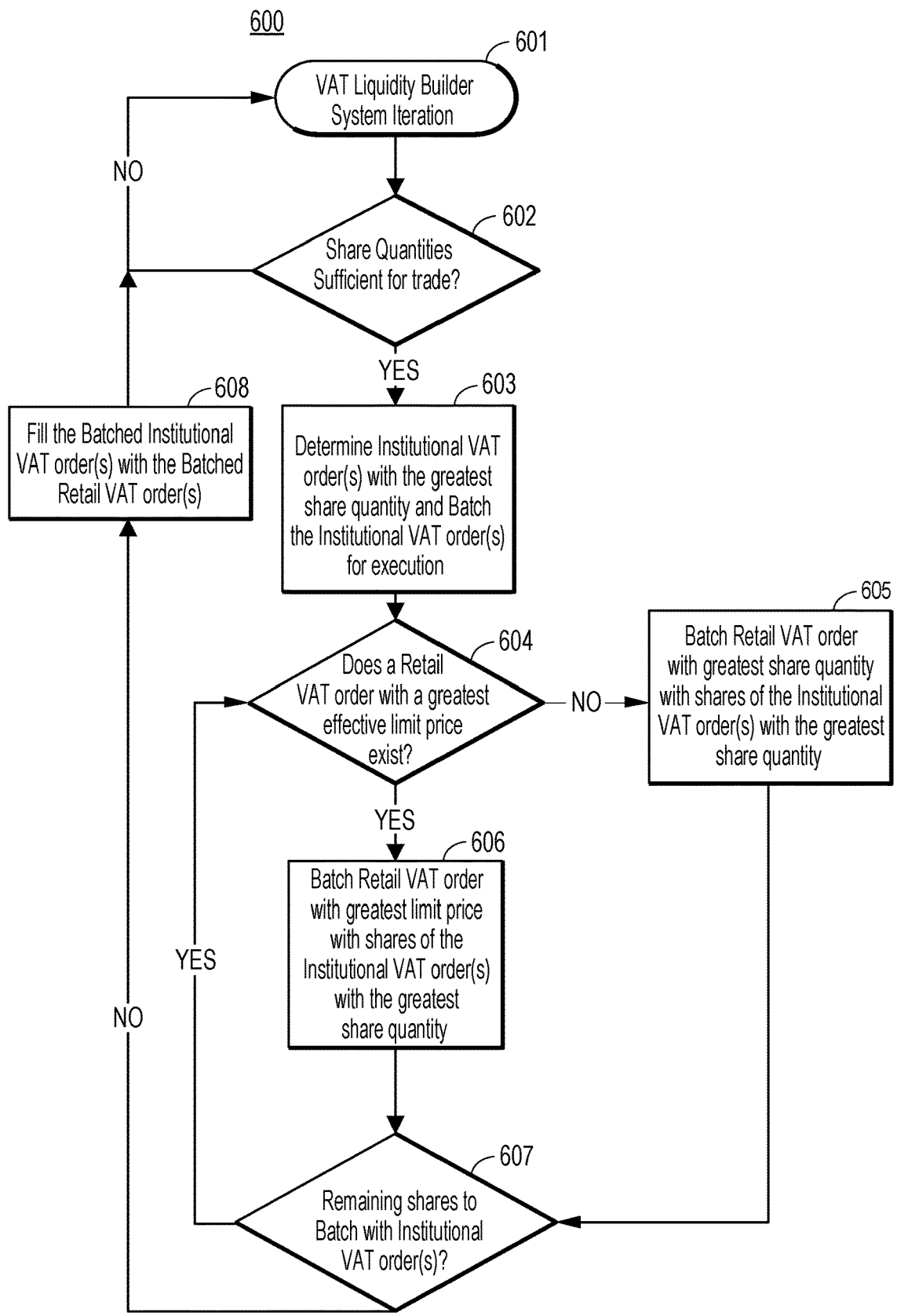

FIG. 6 depicts a method 600 depicting an alternate embodiment of an iterative decision method that may be used by the VAT Liquidity Builder system of FIG. 1. The method 600 is similar in some respects to the method 500, with blocks 601, 602, and 604 corresponding to blocks 501, 502, and 504, respectively, and, accordingly, these blocks will not be described again with respect to FIG. 6. Method 600 primarily differs from method 500 in that, for method 600, the VAT orders are batched for execution, where all orders on both sides of a trade are filled at one time. For example, institutional VAT orders and retail VAT orders identified in block 602 can be batched in memory, such as within a computer memory or memories associated with any of the computing devices, servers or related network devices of FIG. 1 or 2. In method 600, at block 603, the VAT Liquidity Builder system can determine if there are one or more institutional VAT orders with a greatest share quantity available for trade. For example, for a given iteration (601) of the Liquidity Builder System, two such institutional VAT orders may have the same share quantity and tranche price and, thus, can be aggregated together into a second grouping and batched for later execution.

At block 604, as described herein for block 504 of method 500, the system determines whether there is a retail VAT order with a greatest effective limit price. At blocks, 605 and 606, however, instead of filling the retail VAT order with the greatest effective limit price (block 506) or the greatest share quantity (block 505), the VAT Liquidity Builder System batches the retail VAT order with the greatest effective limit price (block 606) or the greatest share quantity (block 605), e.g., in computer memory. Such batched retail VAT order(s) would have effective limit prices that meet or overlap with the limit prices (e.g., tranche price) of the institutional VAT orders(s).

At block 607, the VAT Liquidity Builder system determines whether there are any remaining retail VAT order shares, of the one or many retail VAT orders, to batch with the determined institutional VAT order shares, of the one or many institutional VAT orders, such that the VAT Liquidity Builder system would be in a state to execute a command to fill all orders on both sides of the trade. If there are remaining retail VAT orders to batch, then the VAT Liquidity Builder system proceeds back to block 604, where the VAT Liquidity Builder system would continue to batch retail VAT orders according to blocks 605 and 606 as described herein. At block 607, if the retail VAT order(s) have been batched with the institutional VAT order(s), such that the total share quantity of the retail VAT order(s) equals the total share quantity of the institutional VAT order(s), then the VAT Liquidity Builder system proceeds to block 608, where the VAT Liquidity Builder system generates an execution command to fill the batched institutional VAT order(s) against the batched retail VAT order(s). The VAT Liquidity Builder system would then continue to step 601 for the next iteration, completing blocks 602 to 608 for a new set of VAT orders using method 600 as described herein.

In some embodiments, in order to avoid a potential regulatory concern because liquidity building is a central focus of the VAT Liquidity Builder system and not, e.g., obtaining the "best price" for a small number of shares, investors, or participants of the VAT Liquidity Builder system, before submitting VAT orders to the system, may be required to sign an agreement. For example, the participants may be required to agree and state that that they understand the trade rules or otherwise operation of the VAT Liquidity Builder system and that they believe the VAT systems and methods are beneficial to their economic interests.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A Volume Attentive Trade (VAT) Liquidity Builder system dynamically controlled by a series of VAT rules that determine an execution sequence of corresponding VAT orders received via a computer network from different investor types, the VAT Liquidity Builder system comprising:

a communications port configured to receive, via the computer network, VAT orders associated with either of a first investor type or of a second investor type, each VAT order comprising a data structure defining VAT rules;

a computer memory communicatively coupled to the communications port and configured to store the VAT orders received via the communications port; and a processor communicatively coupled to the computer memory and configured to aggregate in the computer memory, one or more of the VAT orders having the first investor type into a first VAT order group, and the processor further configured to aggregate, in the computer memory, one or more of the VAT orders having the second investor type into a second VAT order group, the processor further configured to control execution of the VAT orders in a sequence determined by each of the VAT rules of the one or more of the VAT orders of the first VAT order group and by each of the VAT rules of the one or more of the VAT orders of the second VAT order group, the processor configured, during a first iteration of the sequence, to:

(a) analyze each of the VAT rules of the one or more of the VAT orders of the second VAT order group and determine a VAT order having a current greatest share quantity from the second VAT order group, (b) analyze each of the VAT rules of the one or more of the VAT orders of the first VAT order group and determine a VAT order having a current greatest effective limit price from the first VAT order group, the processor configured to determine the current greatest effective limit price by combining a limit price and a VAT delta price value of the VAT order having the current greatest effective limit price, and (c) generate an execution command to at least partially fill the current greatest share quantity of the VAT order having the current greatest share quantity from the second VAT order group against a share quantity of the VAT order having the current greatest effective limit price from the first VAT order group.

2. The VAT Liquidity Builder system of claim 1, wherein the processor is further configured, during the first iteration of the sequence, to:

(d) determine a remaining share quantity of the VAT order having the current greatest share quantity from the second VAT order group, the remaining share quantity stored in the computer memory, wherein the processor is further configured, during a second iteration of the sequence, to:

(e) analyze each of the VAT rules of the one or more of the VAT orders of the first VAT order group to determine a VAT order having a next greatest effective limit price from the first VAT order group, the processor configured to determine the next greatest effective limit price by combining a limit price and a VAT delta price value of the VAT order having the next greatest effective limit price, and (f) generate a second execution command to at least partially fill the current greatest share quantity of the VAT order having the current greatest share quantity from the second VAT order group against a next share quantity of the VAT order having the next greatest effective limit price from the first VAT order group.

3. The VAT Liquidity Builder system of claim 1, wherein the communications port is further configured to receive, via the computer network, metadata that indicates an investor type of each of the VAT orders, the processor further configured, based on the metadata, to associate each of the VAT orders with one of the first investor type or the second investor type.

4. The VAT Liquidity Builder system of claim 1, wherein at least a subset of the VAT orders is not accessible via an order book.

5. The VAT Liquidity Builder system of claim 1, wherein at least a subset of the VAT rules is confidential.

6. The VAT Liquidity Builder system of claim 1, wherein the computer memory is configured to store a record associated with the execution command.

7. The VAT Liquidity Builder system of claim 1, wherein the processor is further configured to analyze each of the VAT rules of the one or more of the VAT orders of the first VAT order group to determine a greatest share quantity VAT order from the first VAT order group having a share quantity that is greater than any other share quantity of remaining VAT orders of the first VAT order group, and wherein the greatest share quantity VAT order is a same VAT order as the VAT order having the current greatest effective limit price.

8. The VAT Liquidity Builder system of claim 1, wherein the first investor type includes a retail investor or a non-institutional investor.

9. The VAT Liquidity Builder system of claim 1, wherein the second investor type includes an institutional investor or a non-institutional investor that submitted a VAT order having VAT rules defining a share quantity that exceeds a threshold quantity.

10. The VAT Liquidity Builder system of claim 1, wherein a first VAT order is identifiable as of the first investor type where the VAT rules of the first VAT order defines a share quantity of the first VAT order below a minimum share quantity value, and wherein a second VAT order is identifiable as of the second investor type where the VAT rules of the second VAT order defines a share quantity of the second VAT order equal to or above the minimum share quantity value.

11. The VAT Liquidity Builder system of claim 1, wherein the processor is further configured to suspend the execution command when the current greatest effective limit price is not within a specified range of execution prices, and the processor further configured to resume the execution command when a new or updated current greatest effective limit price of a new or updated VAT order is within the specified range of execution prices.

12. The VAT Liquidity Builder system of claim 1, wherein the communications port is further configured to receive a request to update a VAT delta price value of a VAT order of the first VAT order group.

13. The VAT Liquidity Builder system of claim 1, wherein at least one set of VAT rules of at least one VAT order of the one or more of the VAT orders of the first VAT order group includes VAT delta instructions, the processor configured to, based on the VAT delta instructions, vary the VAT delta price value of the at least one VAT order across a plurality of specified share quantity ranges.

14. The VAT Liquidity Builder system of claim 1, wherein the second VAT order group is associated with a tranche of a specific limit price.

15. The VAT Liquidity Builder system of claim 1, wherein at least one of:

(1) the VAT order having the current greatest share quantity from the second VAT order group is comprised of two or more VAT orders as aggregated into the second VAT order group; or (2) the VAT order having the current greatest effective limit price from the first VAT order group is comprised of two or more VAT orders as aggregated into the first VAT order group.

16. A Volume Attentive Trade (VAT) Liquidity Builder method for dynamically controlling, by a series of VAT rules, an execution sequence of corresponding VAT orders received via a computer network from different investor types, the VAT Liquidity Builder method comprising:
   receiving, at a communications port from the computer network, VAT orders associated with either of a first investor type or of a second investor type, each VAT order comprising a data structure defining VAT rules;
   storing, in a computer memory communicatively coupled to the communications port, the VAT orders;
   aggregating, by a processor communicatively coupled to the computer memory in the computer memory, one or more of the VAT orders of the first investor type into a first VAT order group;
   aggregating, by the processor in the computer memory, one or more of the VAT orders of the second investor type into a second VAT order group;
   controlling, by the processor analyzing each of the VAT rules of the one or more of the VAT orders of the first VAT order group and by each of the VAT rules of the one or more of the VAT orders of the second VAT order group, execution of the VAT orders during a first iteration of a sequence;
   (a) analyzing, by the processor during the first iteration of the sequence, each of the VAT rules of the one or more of the VAT orders of the second VAT order group and determine a VAT order having a current greatest share quantity from the second VAT order group;
   (b) analyzing, by the processor during the first iteration of the sequence, each of the VAT rules of the one or more of the VAT orders of the first VAT order group and determine a VAT order having a current greatest effective limit price from the first VAT order group, and determining the current greatest effective limit price by combining a limit price and a VAT delta price value of the VAT order having the current greatest effective limit price; and
   (c) generating, by the processor during the first iteration of the sequence, an execution command to at least partially fill the current greatest share quantity of the VAT order having the current greatest share quantity from the second VAT order group against a share quantity of the VAT order having the current greatest effective limit price from the first VAT order group.

17. The VAT Liquidity Builder method of claim 16 further comprising:
   (d) determining, by the processor during the first iteration of the sequence, a remaining share quantity of the VAT order having the current greatest share quantity from the second VAT order group;
   (e) analyzing, by the processor during a second iteration of the sequence, each of the VAT rules of the one or more of the VAT orders of the first VAT order group to determine a VAT order having a next greatest effective limit price from the first VAT order group, the next greatest effective limit price determined by combining a limit price and a VAT delta price value of the VAT order having the next greatest effective limit price; and
   (f) generating, by the processor during the second iteration of the sequence, a second execution command to at least partially fill the current greatest share quantity of the VAT order having the current greatest share quantity from the second VAT order group against a next share quantity of the VAT order having the next greatest effective limit price from the first VAT order group.

18. The VAT Liquidity Builder method of claim 16 further comprising receiving, at the communications port via the computer network, metadata that indicates an investor type of each of the VAT orders, and associating, based on the metadata, each of the VAT orders with one of the first investor type or the second investor type.

19. The VAT Liquidity Builder method of claim 16, wherein at least a subset of the VAT orders is not accessible via an order book.

20. The VAT Liquidity Builder method of claim 16 further comprising storing a record associated with the execution command.

21. The VAT Liquidity Builder method of claim 16 further comprising analyzing, by the processor, each of the VAT rules of the one or more of the VAT orders of the first VAT order group to determine a greatest share quantity VAT order from the first VAT order group having a share quantity that is greater than any other share quantity of remaining VAT orders of the first VAT order group, and wherein the greatest share quantity VAT order is a same VAT order as the VAT order having the current greatest effective limit price.

22. The VAT Liquidity Builder method of claim 16, wherein the first investor type includes a retail investor or a non-institutional investor.

23. The VAT Liquidity Builder method of claim 16, wherein the second investor type includes an institutional investor or a non-institutional investor that submitted a VAT order having VAT rules defining a share quantity that exceeds a threshold quantity.

24. The VAT Liquidity Builder method of claim 16, wherein a first VAT order is identifiable as of the first investor type where the VAT rules of the first VAT order defines a share quantity of the first VAT order below a minimum share quantity value, and wherein a second VAT order is identifiable as of the second investor type where the VAT rules of the second VAT order defines a share quantity of the second VAT order equal to or above the minimum share quantity value.

25. The VAT Liquidity Builder method of claim 16 further comprising suspending, by the processor, the execution command when the current greatest effective limit price is not within a specified range of execution prices, and resuming, by the processor, the execution command when a new or updated current greatest effective limit price of a new or updated VAT order is within the specified range of execution prices.

26. The VAT Liquidity Builder method of claim 16, further comprising receiving, at the communications port, a request to update a VAT delta price value of a VAT order of the first VAT order group.

27. The VAT Liquidity Builder method of claim 16, wherein at least one set of VAT rules of at least one VAT order of the one or more of the VAT orders of the first VAT order group includes VAT delta instructions, and varying, by the processor based on the VAT delta instructions, the VAT delta price value of the at least one VAT order across a plurality of specified share quantity ranges.

28. The VAT Liquidity Builder method of claim 16, wherein the second VAT order group is associated with a tranche of a specific limit price.

29. The VAT Liquidity Builder method of claim 16, wherein at least one of:
   (1) the VAT order having the current greatest share quantity from the second VAT order group is comprised of two or more VAT orders as aggregated into the second VAT order group; or (2) the VAT order having the current greatest effective limit price from the first VAT order group is comprised of two or more VAT orders as aggregated into the first VAT order group.

30. A non-transitory computer-readable medium for implementing dynamic control by a series of Volume Attentive Trade (VAT) rules that determine execution sequences of corresponding VAT orders, the non-transitory computer readable medium comprising instructions, wherein said instructions when executed cause one or more processors to:

receive, at a communications port from the computer network, VAT orders associated with either of a first investor type or of a second investor type, each VAT order comprising a data structure defining VAT rules;

store, in a computer memory communicatively coupled to the communications port, the VAT orders;

aggregate, in the computer memory, one or more of the VAT orders of the first investor type into a first VAT order group;

aggregate, in the computer memory, one or more of the VAT orders of the second investor type into a second VAT order group;

control, by analyzing each of the VAT rules of the one or more of the VAT orders of the first VAT order group and by each of the VAT rules of the one or more of the VAT orders of the second VAT order group, execution of the VAT orders during a first iteration of a sequence;

(a) analyze, during the first iteration of the sequence, each of the VAT rules of the one or more of the VAT orders of the second VAT order group and determine a VAT order having a current greatest share quantity from the second VAT order group;

(b) analyze, during the first iteration of the sequence, each of the VAT rules of the one or more of the VAT orders of the first VAT order group and determine a VAT order having a current greatest effective limit price from the first VAT order group, and determining the current greatest effective limit price by combining a limit price and a VAT delta price value of the VAT order having the current greatest effective limit price; and (c) generate, during the first iteration of the sequence, an execution command to at least partially fill the current greatest share quantity of the VAT order having the current greatest share quantity from the second VAT order group against a share quantity of the VAT order having the current greatest effective limit price from the first VAT order group.

* * * * *